(12) United States Patent
Takahashi et al.

(10) Patent No.: US 12,741,342 B2
(45) Date of Patent: Sep. 22, 2026

(54) PROCESSING DEVICE, DETECTING SYSTEM, PROCESSING METHOD, INSPECTION METHOD, AND STORAGE MEDIUM

(71) Applicant: Kabushiki Kaisha Toshiba, Kawasaki (JP)

(72) Inventors: Hiromasa Takahashi, Minato (JP); Yasunori Chiba, Yokohama (JP); Masahiro Saito, Yokohama (JP); Takuya Atsumi, Hamamatsu (JP); Shin Matsumoto, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 287 days.

(21) Appl. No.: 18/414,946

(22) Filed: Jan. 17, 2024

(65) Prior Publication Data

US 2024/0149380 A1 May 9, 2024

Related U.S. Application Data

(63) Continuation of application No. PCT/JP2022/027977, filed on Jul. 19, 2022.

(30) Foreign Application Priority Data

Jul. 19, 2021 (JP) ................................. 2021-118942

(51) Int. Cl.
*B23K 31/12* (2006.01)
*G01N 29/04* (2006.01)
(Continued)

(52) U.S. Cl.
CPC ............ *B23K 31/125* (2013.01); *G01S 15/08* (2013.01)

(58) Field of Classification Search
CPC ...... G01N 29/00; G01N 29/04; G01N 29/041; G01N 29/24; G01N 29/2431; G01S 15/08
See application file for complete search history.

(56) References Cited

U.S. PATENT DOCUMENTS 8,811,721 B2 8/2014 Matsumoto et al.
12,153,018 B2 * 11/2024 Takahashi ............ G01N 29/041
(Continued)

FOREIGN PATENT DOCUMENTS

CN 101617223 A 12/2008
CN 102105107 A 8/2011
(Continued)

OTHER PUBLICATIONS

International Search Report issued Sep. 6, 2022 in PCT/JP2022/027977 filed on Jul. 19, 2022, 2 pages.
(Continued)

*Primary Examiner* — Nguyen Q. Ha
(74) *Attorney, Agent, or Firm* — Oblon, McClelland, Maier & Neustadt, L.L.P.

(57) ABSTRACT

Provided are a processing device, a detecting system, a processing method, a program, and a storage medium that obtain a position of a weld portion of a joined body with higher accuracy. A processing device according to an embodiment receives intensity data of a reflected wave obtained by transmitting an ultrasonic wave along a first direction toward a joined body. The device designates a weld portion of the joined body by using the intensity data. The device calculates a first center position of the weld portion in a first plane crossing the first direction.

16 Claims, 11 Drawing Sheets

(51) Int. Cl.
*G01N 29/24* (2006.01)
*G01S 15/08* (2006.01)

(56) References Cited

U.S. PATENT DOCUMENTS

| | | | | |
|---|---|---|---|---|
| 2008/0210009 | A1* | 9/2008 | Tanishiki | G01N 29/043 73/588 |
| 2012/0243771 | A1 | 9/2012 | Matsumoto et al. | |
| 2018/0080763 | A1 | 3/2018 | Kasahara et al. | |
| 2018/0259489 | A1* | 9/2018 | Bruch | G01N 29/265 |
| 2020/0003735 | A1 | 1/2020 | Ushijima et al. | |
| 2020/0018727 | A1 | 1/2020 | Ono et al. | |
| 2020/0271627 | A1* | 8/2020 | Battenberg | B23K 11/0026 |
| 2020/0363377 | A1* | 11/2020 | Saito | G01N 29/07 |
| 2022/0196611 | A1* | 6/2022 | Ramle | B25J 9/1679 |
| 2023/0012625 | A1 | 1/2023 | Chiba et al. | |
| 2023/0020518 | A1 | 1/2023 | Chiba et al. | |
| 2023/0024687 | A1 | 1/2023 | Saito et al. | |
| 2023/0330784 | A1* | 10/2023 | Asai | B25J 13/087 |

FOREIGN PATENT DOCUMENTS

| | | | |
|---|---|---|---|
| CN | 103784165 | A | 5/2014 |
| CN | 111830060 | A | 10/2020 |
| DE | 102019104654 | A1 | 8/2020 |
| JP | 2006-153710 | A | 6/2006 |
| JP | 2006-220613 | A | 8/2006 |
| JP | 2007-278809 | A | 10/2007 |
| JP | 2011-117877 | A | 6/2011 |
| JP | 2019-90727 | A | 6/2019 |
| JP | 2020-8452 | A | 1/2020 |
| JP | 2020-187005 | A | 11/2020 |
| JP | 2023-14805 | A | 1/2023 |
| JP | 2023-14818 | A | 1/2023 |
| JP | 2023-14869 | A | 1/2023 |

OTHER PUBLICATIONS

Indian Office Action issued Jun. 6, 2025, in Indian Patent Application No. 202417010423, 8 pages.
Chinese Office Action dated Apr. 24, 2026, issued in Chinese Patent Application No. 202280060420.3 (with English translation, Documents 1 and 18-22 being cited therein).

* cited by examiner

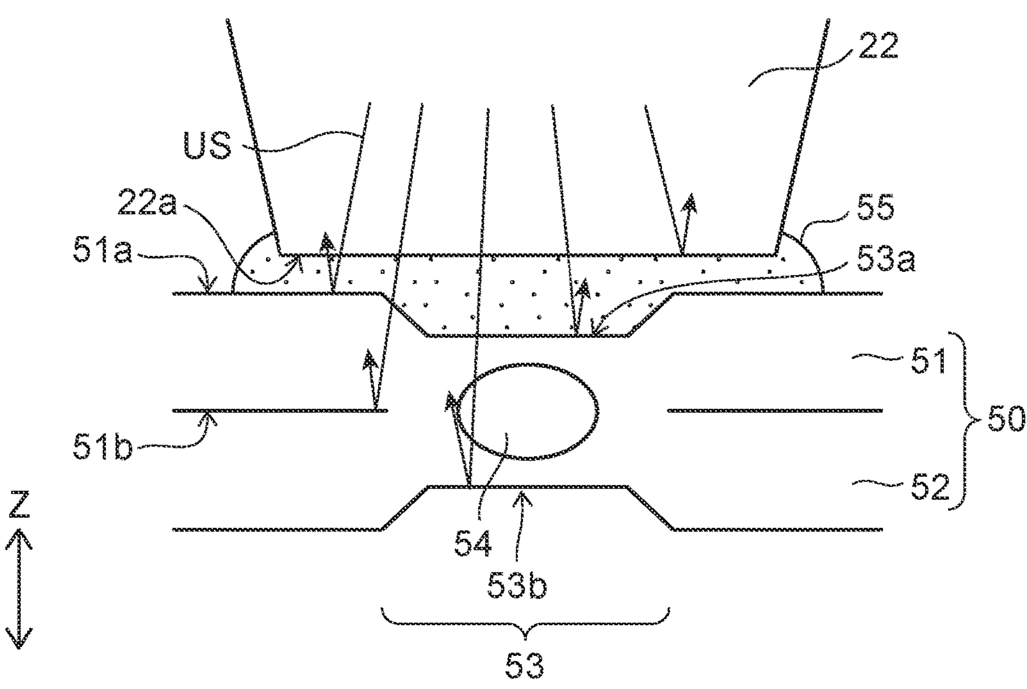
FIG. 4A
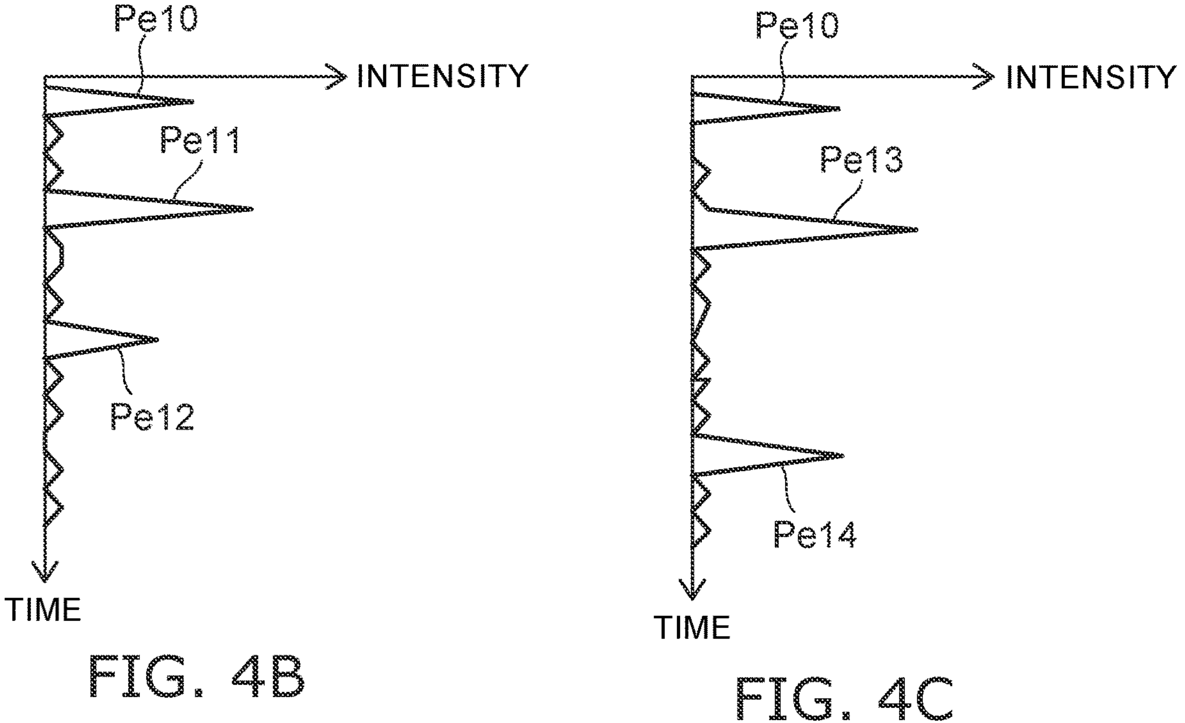
FIG. 4B
FIG. 4C

PROCESSING DEVICE, DETECTING SYSTEM, PROCESSING METHOD, INSPECTION METHOD, AND STORAGE MEDIUM

CROSS-REFERENCE TO RELATED APPLICATIONS

This is a continuation application of International Patent Application No. PCT/JP2022/027977, filed on Jul. 19, 2022; and also claims priority to Japanese Patent Application No. 2021-118942, filed on Jul. 19, 2021; the entire contents of which are incorporated herein by reference.

FIELD

Embodiments of the invention relate to a processing device, a detecting system, a processing method, an inspection method, and a storage medium.

BACKGROUND

There is a system that transmits an ultrasonic wave toward a joined body and detects a reflected wave. For such a system, there is a need for technology that obtains the position of a weld portion of the joined body with higher accuracy.

BRIEF DESCRIPTION OF DRAWINGS

FIGS. 4A to 4C are schematic views for describing an operation of the detecting system according to the embodiment;

DETAILED DESCRIPTION

Figure 1:
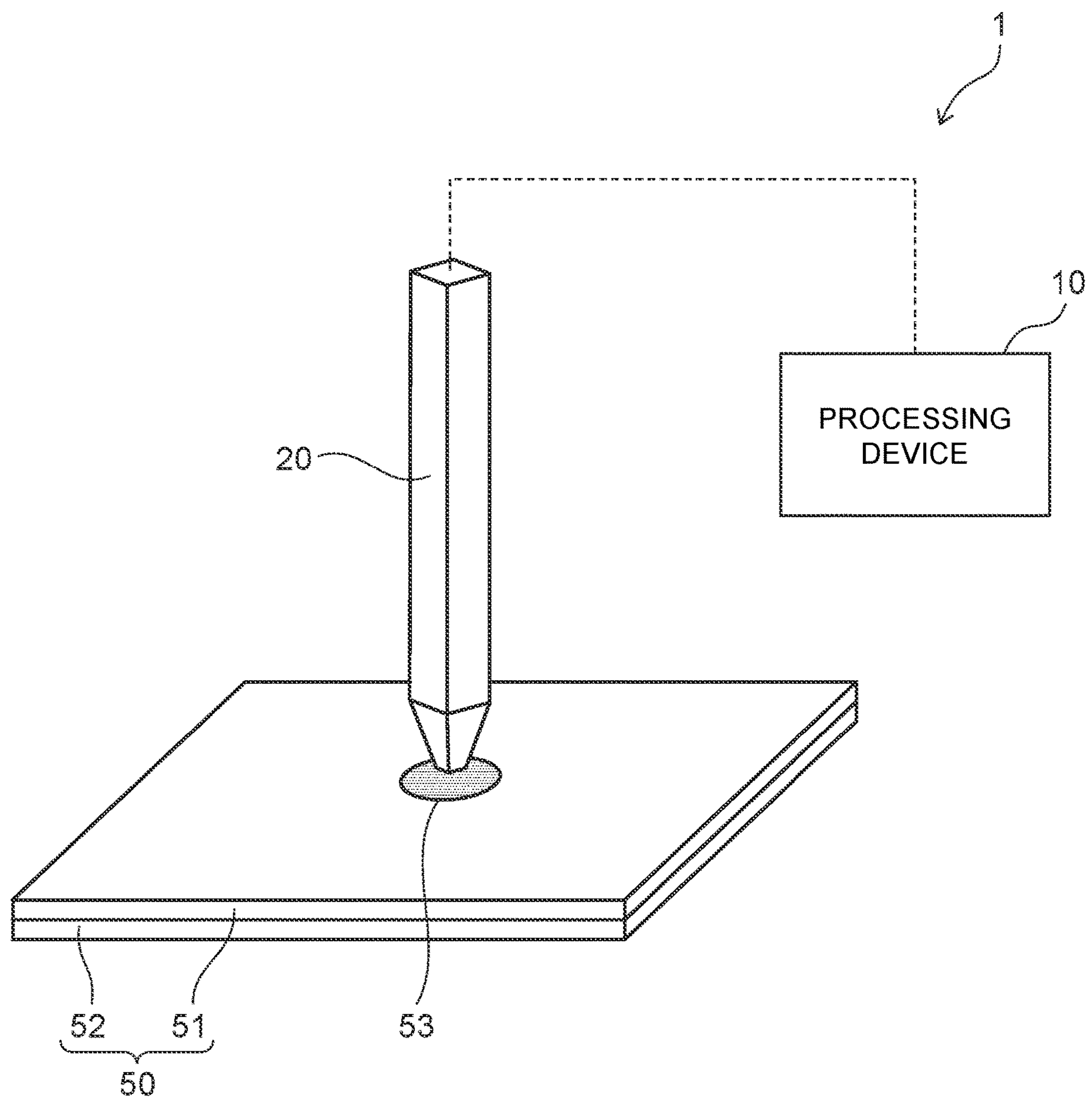
FIG. 1 is a schematic view showing a detecting system according to an embodiment.

Embodiments of the invention will now be described with reference to the drawings.

The drawings are schematic or conceptual; and the relationships between the thickness and width of portions, the proportions of sizes among portions, etc., are not necessarily the same as the actual values. The dimensions and proportions may be illustrated differently among drawings, even when the same portion is illustrated.

In the specification and drawings, components similar to those already described are marked with the same reference numerals; and a detailed description is omitted as appropriate.

FIG. 1 is a schematic view showing a detecting system according to an embodiment.

The detecting system 1 according to the embodiment includes a processing device 10 and a detector 20.

The detector 20 transmits an ultrasonic wave toward a joined body 50 and detects (receives) a reflected wave of the ultrasonic wave. In the example of FIG. 1, the detector 20 has a rod shape that can be gripped by a human. When detecting the reflected wave, the detector 20 transmits intensity data indicating the intensity of the reflected wave to the processing device 10. Hereinbelow, the transmission of the ultrasonic wave and the detection of the reflected wave by the detector 20 also are called a probe (probing).

The joined body 50 includes a metal plate 51 (a first member) and a metal plate 52 (a second member). The metal plate 51 and the metal plate 52 are resistance spot-welded at a weld portion 53. The processing device 10 performs various processing by using the intensity data. For example, the processing device 10 designates the position of the weld portion 53 of the joined body 50. The processing device 10 also calculates the center position of the weld portion 53. Furthermore, the processing device 10 may determine the goodness of the joined body 50. The processing device 10 may calculate the diameter of the weld portion 53. The processing device 10 may inspect the weld portion 53.

Figure 2:
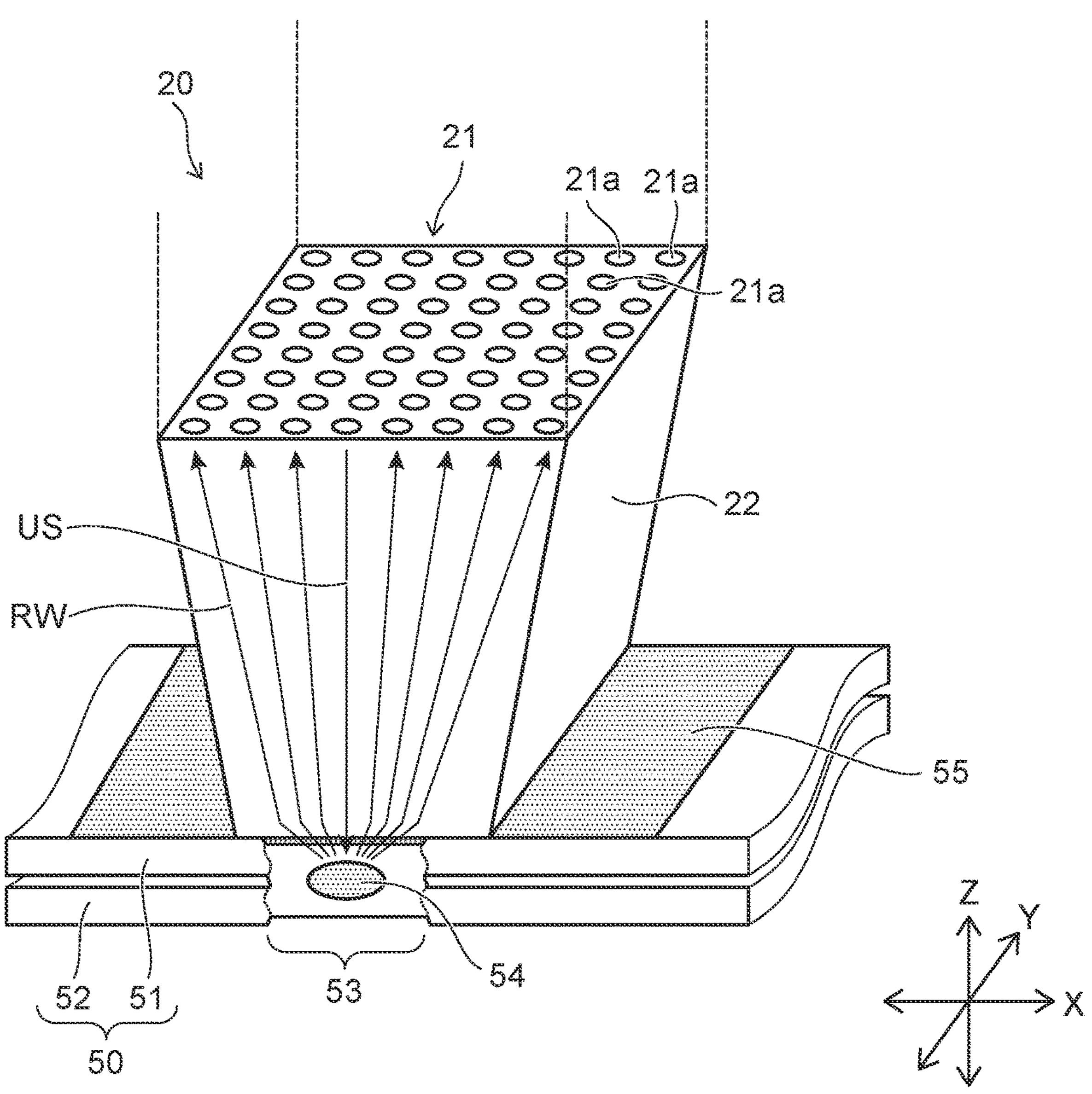
FIG. 2 is a schematic view showing an internal structure of a detector.

FIG. 2 is a schematic view showing an internal structure of the detector.

As shown in FIG. 2, the detector 20 includes an element array 21 and a propagating part 22. The element array 21 includes multiple detection elements 21*a*. For example, the detection element 21*a* is a transducer and emits an ultrasonic wave of a frequency of not less than 1 MHz and not more than 100 MHz. The detection element 21*a* transmits the ultrasonic wave along a Z-direction (a first direction). The multiple detection elements 21*a* are arranged in an X-direction (a second direction) and a Y-direction (a third direction). The X-direction crosses the Z-direction. The Y-direction crosses the X-Z plane. In the example of FIG. 2, the X-direction, the Y-direction, and the Z-direction are orthogonal to each other.

The propagating part 22 is located at the distal end of the detector 20. The element array 21 is covered with the propagating part 22. The propagating part 22 is positioned between the element array 21 and the weld portion 53 when the distal end of the detector 20 is caused to contact the weld portion 53. When the element array 21 emits the ultrasonic wave, the ultrasonic wave propagates through the propagating part 22 and is transmitted outside the detector 20. When the ultrasonic wave is reflected, the reflected wave of the ultrasonic wave propagates through the propagating part 22 and reaches the element array 21. The element array 21 detects the reflected wave and transmits a signal (intensity data) indicating the reflected wave intensity to the processing device 10. The intensity of the signal transmitted from the element array 21 corresponds to the intensity of the reflected wave.

The propagating part 22 includes a resin material or the like through which the ultrasonic wave easily propagates. The propagating part 22 can suppress deformation, damage, and the like of the element array 21 when the detector 20 contacts the weld portion 53. The propagating part 22 has a hardness sufficient to suppress the deformation, damage, and the like when contacting the weld portion 53.

A solidified portion 54 is formed in the weld portion 53. The solidified portion 54 is formed by a portion of the metal plate 51 and a portion of the metal plate 52 melting, mixing, and solidifying. A couplant liquid 55 is coated onto the surface of the joined body 50. The ultrasonic wave easily propagates between the detector 20 and the joined body 50 due to the couplant liquid 55. Each detection element 21*a* transmits an ultrasonic wave US toward the joined body 50 coated with the couplant 15, and detects a reflected wave RW from the joined body 50.

For example, as shown in FIG. 2, one detection element 21*a* transmits the ultrasonic wave US toward the joined body 50. A portion of the ultrasonic wave US is reflected by the upper surface or lower surface of the joined body 50, etc. The multiple detection elements 21*a* each detect the reflected wave RW. In the probing, the detection elements 21*a* each sequentially transmit the ultrasonic wave US; and each reflected wave RW is detected by the multiple detection elements 21*a*.

Figure 3:
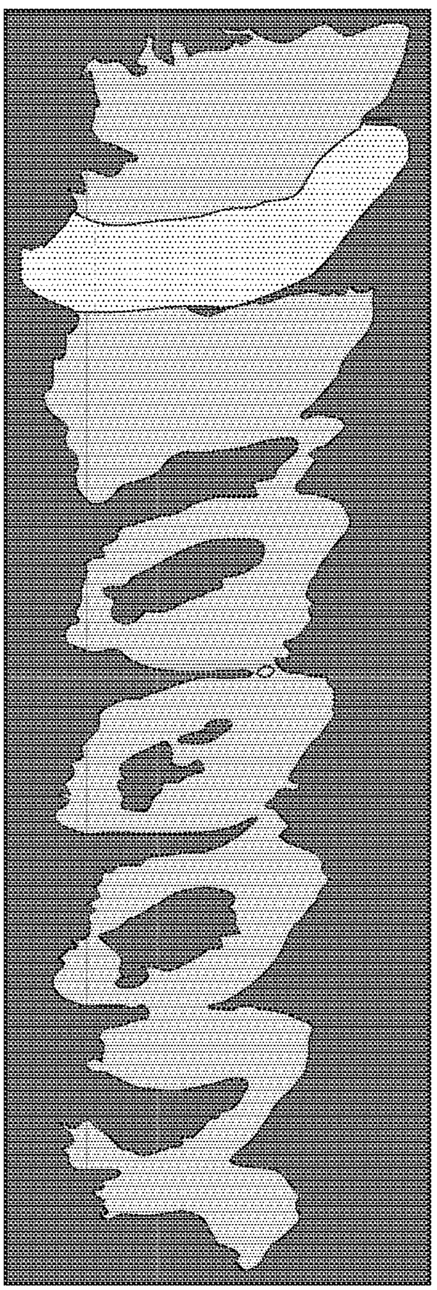
FIG. 3 is a schematic view illustrating a three-dimensional detection result obtained by probing.
Figure 3:
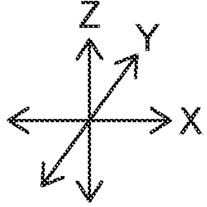

FIG. 3 is a schematic view illustrating a three-dimensional detection result obtained by probing.

In the probing as described above, the detection elements 21*a* each sequentially transmit an ultrasonic wave; and each reflected wave is detected by the multiple detection elements 21*a*. In the specific example shown in FIGS. 2, 8*x*8, i.e., sixty-four detection elements 21*a* are provided. In such a case, the sixty-four detection elements 21*a* sequentially transmit ultrasonic waves. One detection element 21*a* repeatedly detects the reflected wave 64 times. The detection result of the Z-direction reflected wave intensity distribution is output 64 times from one detection element 21*a*. The sixty-four intensity distributions of the reflected waves output from the one detection element 21*a* are summed. In one probing, the summed intensity distribution is the intensity distribution at the coordinates at which the one detection element 21*a* is located. Similar processing is performed for the detection result of each of the sixty-four detection elements 21*a*. Aperture synthesis may be performed to increase the resolution in the X-direction and Y-direction of the detection results of the detection elements 21*a*. Thus, the reflected wave intensity distribution in the Z-direction is generated at points in the X-Y plane (the first plane). In other words, three-dimensional intensity data that includes the reflected wave intensities at points in the X-direction, the Y-direction, and the Z-direction is obtained.

The schematic view of FIG. 3 shows the appearance of the three-dimensional intensity data at the weld portion 53 vicinity. In FIG. 3, portions at which the luminance is high are portions at which the reflected wave intensity of the ultrasonic wave is relatively large. In the example of FIG. 3, reflected waves from the upper surface and lower surface of the weld portion 53 and reflected waves of multiple reflections between the upper surface and the lower surface appear.

FIGS. 4A to 4C are schematic views for describing an operation of the detecting system according to the embodiment.

As shown in FIG. 4A, the ultrasonic wave US is reflected by a surface 22*a* of the propagating part 22, an upper surface 51*a* and a lower surface 51*b* of the metal plate 51, and an upper surface 53*a* and a lower surface 53*b* of the weld portion 53.

The Z-direction positions of the surface 22*a*, the upper surface 51*a*, the upper surface 53*a*, the lower surface 51*b*, and the lower surface 53*b* are different from each other. In other words, the Z-direction distances between the detection element 21*a* and these surfaces are different from each other. The detection element 21*a* detects peaks of the reflected wave intensities when detecting the reflected waves from these surfaces. Which surface reflected the ultrasonic wave US can be discriminated by calculating the time until each peak is detected after transmitting the ultrasonic wave US.

FIGS. 4B and 4C are graphs illustrating the relationship between the time after transmitting the ultrasonic wave US and the intensity of the reflected wave RW at one point in the X-Y plane. In FIGS. 4B and 4C, the horizontal axis is the intensity of the detected reflected wave RW. The vertical axis is the elapsed time after transmitting the ultrasonic wave US. The time corresponds to the Z-direction position. The graph of FIG. 4B illustrates a detection result of the reflected waves RW from the surface 22*a*, the upper surface 51*a*, and the lower surface 51*b*. In other words, the graph of FIG. 4B illustrates the detection result of the reflected waves RW from a point that is not joined. The graph of FIG. 4C illustrates the detection result of the reflected waves RW from the surface 22*a*, the upper surface 53*a*, and the lower surface 53*b*. In other words, the graph of FIG. 4C illustrates the detection result of the reflected waves RW from a point that is joined.

In the graphs of FIGS. 4B and 4C, a peak Pen is based on the reflected wave RW from the surface 22*a*. A peak Pe11 is based on the reflected wave RW from the upper surface 51*a*. A peak Pe12 is based on the reflected wave RW from the lower surface 51*b*. Times from the transmission of the ultrasonic wave US until the peaks Pe11 and Pe12 are detected correspond respectively to the Z-direction positions of the upper surface 51*a* and the lower surface 51*b*.

Similarly, a peak Pe13 is based on the reflected wave RW from the upper surface 53*a*. A peak Pe14 is based on the reflected wave RW from the lower surface 53*b*. The times from the transmission of the ultrasonic wave US until the peaks Pe13 and Pe14 are detected correspond respectively to the Z-direction positions of the upper surface 53*a* and the lower surface 53*b*.

The processing device 10 determines whether or not the peak Pe12 exists in the Z-direction reflected wave intensity distribution at points in the X-Y plane. Specifically, the processing device 10 detects a peak in a range in the Z-direction in which the peak Pe12 may be detected. The processing device 10 compares the peak intensity with a threshold. The threshold and the range in the Z-direction are preset.

When the peak intensity is greater than the threshold, the processing device 10 determines that the peak is the peak Pe12. The existence of the peak Pe12 indicates that the lower surface 51*b* exists at the point, and that the metal plate 51 and the metal plate 52 are not joined. The processing device 10 determines that points at which the peak Pe12 is detected are not joined. The processing device 10 determines that points at which the peak Pe12 is not detected are joined. The processing device 10 sequentially determines whether or not points in the X-Y plane are joined. The processing device 10 designates a cluster of points determined to be joined as the weld portion 53.

In the examples of FIGS. 4B and 4C, the intensity of the reflected wave RW is expressed as an absolute value. The intensity of the reflected wave may be expressed in any form. For example, the reflected wave intensity that is output from the detection element 21*a* includes positive values and negative values according to the phase. Various processing may be performed based on the reflected wave intensity including positive values and negative values. The reflected wave intensity that includes positive values and negative values may be converted into absolute values. The average value of the reflected wave intensities may be subtracted from the reflected wave intensity at each time. Or, the weighted average value, the weighted moving average value, etc., of the reflected wave intensities may be subtracted from the reflected wave intensity at each time. Filtering may be performed to extract only a frequency component of a specific period. The various processing described in the application can be performed even when the results of such processing applied to the reflected wave intensity are used.

Figure 5:
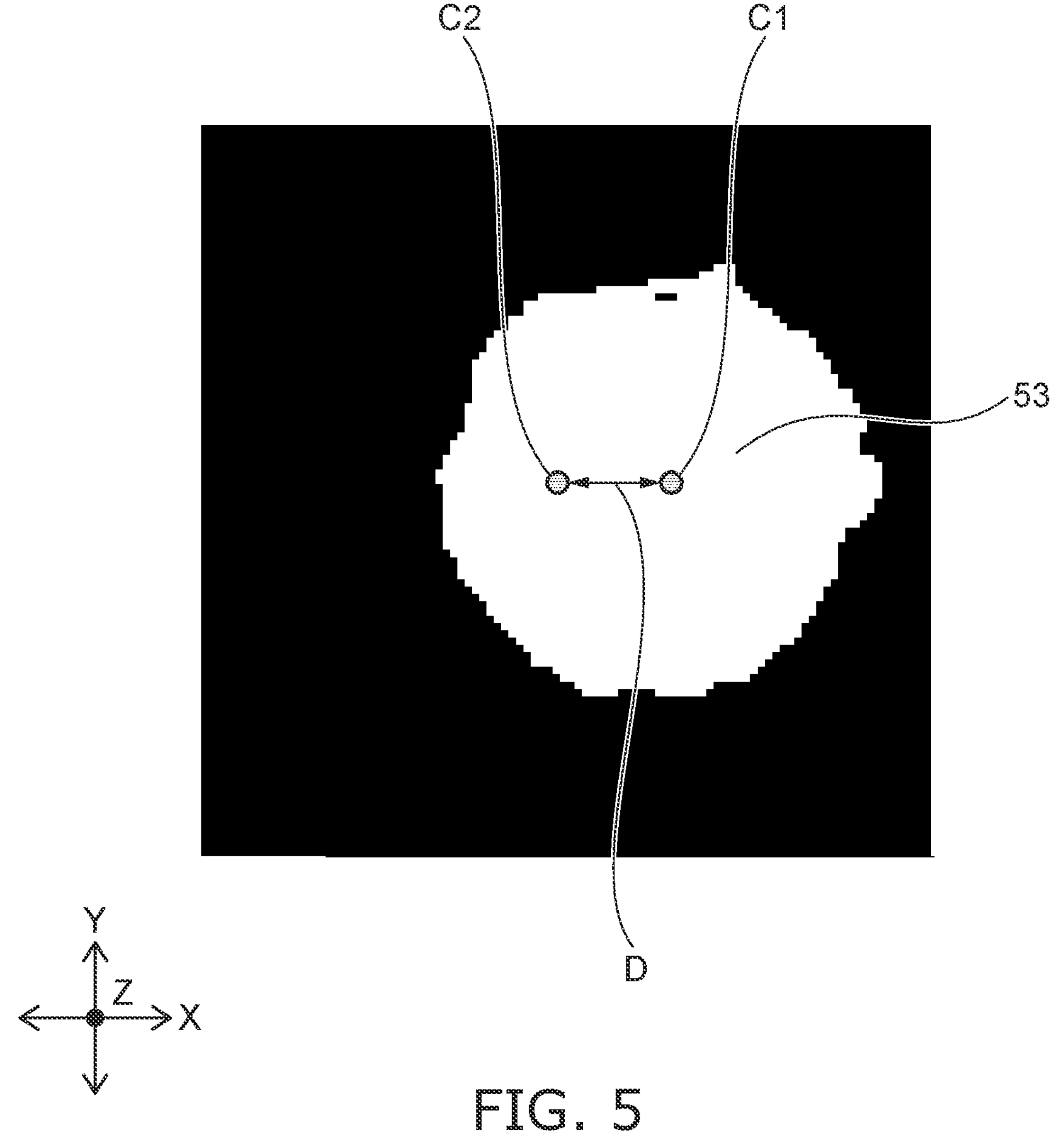
FIG. 5 is a schematic view showing an example of a designated weld portion.

FIG. 5 is a schematic view showing an example of a designated weld portion.

FIG. 5 shows the result of determining the joint or non-joint described above. The ranges in the X-direction and Y-direction of the region in which the determination of the joint or non-joint is performed correspond to the ranges in the X-direction and Y-direction in which the intensity data is obtained. As an example, the range in the X-direction and the range in the Y-direction of the two-dimensional data shown in FIG. 5 correspond respectively to the range in the X-direction and the range in the Y-direction of the three-dimensional intensity data shown in FIG. 3. A portion of the range in the X-direction and Y-direction in which the intensity data is obtained may be extracted, and the determination of the joint or non-joint may be performed for the extracted region. The determination is performed for points of the intensity data in the X-Y plane. In FIG. 5, the points that are determined to be joined based on the intensity data are illustrated using white. The points that are determined not to be joined are illustrated using black. A cluster of points determined to be joined corresponds to the weld portion 53. The processing device 10 uses the determination result of the joining at the points to generate the two-dimensional data shown in FIG. 5.

The processing device 10 calculates the center position in the X-Y plane of the weld portion 53 by using the two-dimensional data shown in FIG. 5. Here, the center position in the X-Y plane of the weld portion 53 is called a first center position. For example, the processing device 10 calculates the centroid position in the X-Y plane of the weld portion 53 by using the two-dimensional data shown in FIG. 5. The centroid position of the weld portion 53 is used as the first center position.

The weld portion 53 is formed by resistance spot welding and is therefore generally circular. The processing device 10 may use the center position calculated by any of the following methods as the center position of the weld portion 53. In a first method, the processing device 10 generates an approximate circle of the weld portion 53 by the least-squares method and calculates the center position of the approximate circle. In a second method, the processing device 10 generates the maximum inscribed circle inscribed by the outer edge of the weld portion 53 and calculates the center position of the inscribed circle. In a third method, the processing device 10 generates the minimum circumscribed circle circumscribed by the outer edge of the weld portion 53 and calculates the center position of the circumscribed circle. In a fourth method, the processing device 10 calculates the center position of an inscribed circle and a circumscribed circle having the minimum radius difference.

The processing device 10 uses any of the methods to calculate a first center position C1 as shown in FIG. 5.

Furthermore, the processing device 10 calculates the position of the center in the X-Y plane of the received intensity data. Here, the center position in the X-Y plane of the intensity data is called a second center position. For example, the processing device 10 calculates the center position in the X-Y plane of the three-dimensional intensity data shown in FIG. 3 as the second center position. Or, the processing device 10 may calculate the center position in the X-Y plane of the two-dimensional data shown in FIG. 5 as the second center position.

The processing device 10 uses any of the methods to calculate a second center position C2 as shown in FIG. 5.

As shown in FIG. 5, the processing device 10 calculates a distance D between the first center position and the second center position. The distance D corresponds to the misalignment of the actual position of the weld portion 53 from the predesigned position (the design position) of the weld portion 53. A value that is based on the distance D is compared with a preset first threshold. For example, the distance D is compared with the first threshold. A value that is calculated using the distance D may be compared with the first threshold. The first threshold is set according to the allowable amount of the misalignment of the position. When the value based on the distance D is greater than the first threshold, the processing device 10 outputs a first notification to the user. The first notification indicates to the user that the center of the weld portion 53 is misaligned from the center of the detection range of the reflected wave.

Figure 6:
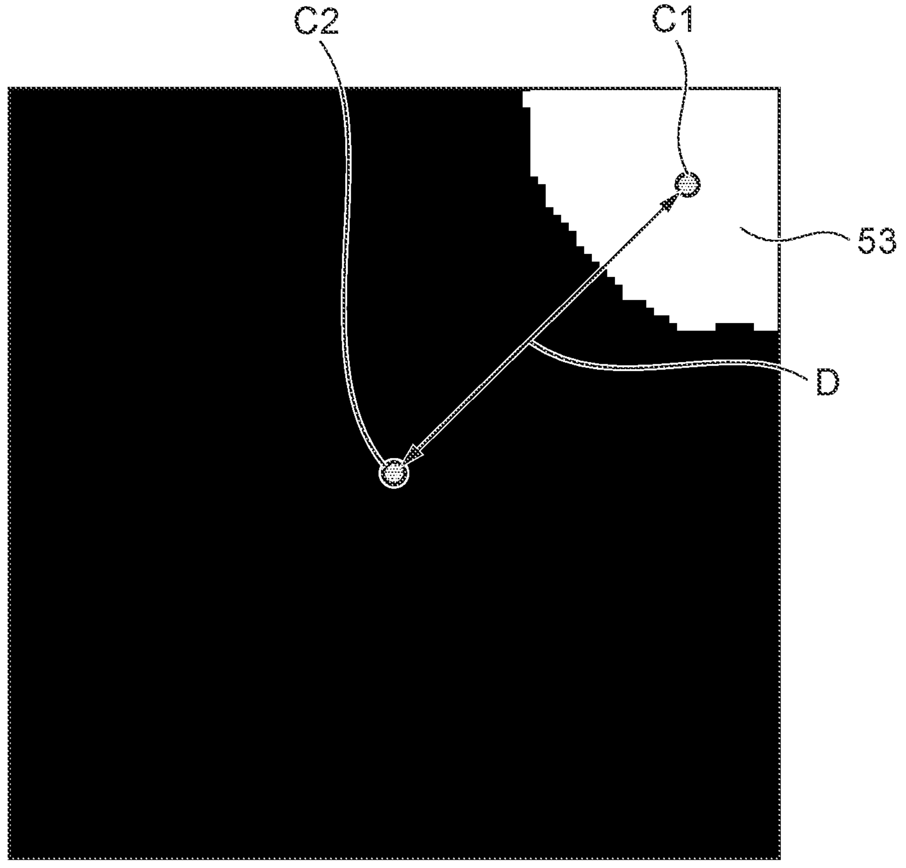
FIG. 6 is a schematic view showing another example of the designated weld portion.
Figure 6:
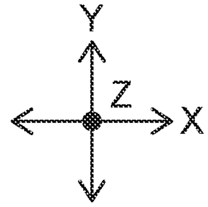

FIG. 6 is a schematic view showing another example of the designated weld portion.

Similarly to FIG. 5, FIG. 6 shows the result of determining a joint or non-joint at points of the intensity data in the X-Y plane. In the example shown in FIG. 6, a portion of the weld portion 53 is positioned outside the area of the obtained intensity data. In such a case, as shown in FIG. 6, the distance D between the second center position C2 and the first center position C1 of the weld portion 53 designated from the intensity data is long compared to the example shown in FIG. 5. As a result, the distance D is greater than the first threshold; and the first notification is output to the user.

When the entire weld portion 53 is positioned outside the area of the obtained intensity data, the first center position C1 and the distance D cannot be calculated. In such a case, the processing device 10 outputs a notification to the user similarly to when the distance D is greater than the first threshold.

Figure 7:
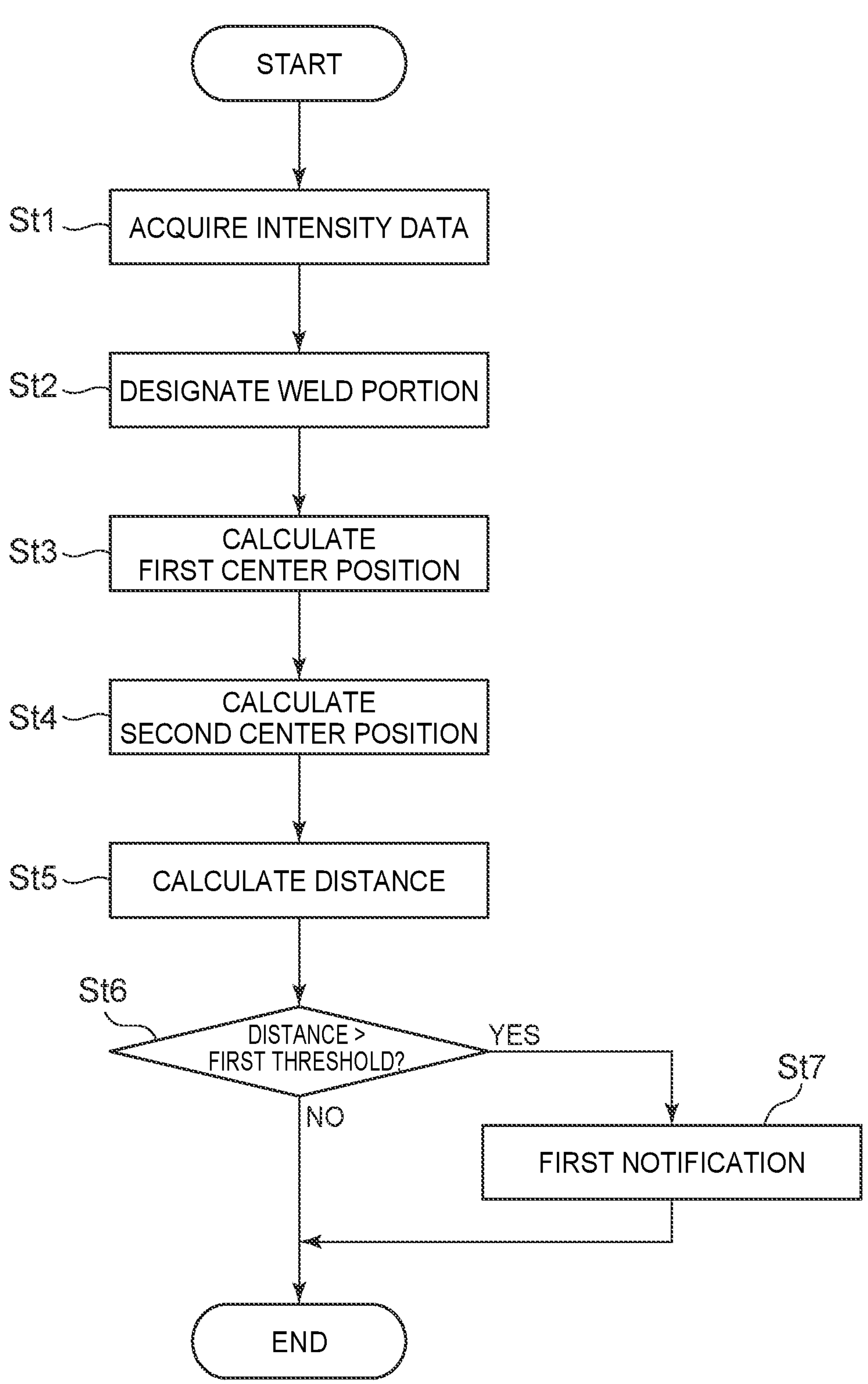
FIG. 7 is a flowchart showing an example of the operation of the detecting system according to the embodiment.

FIG. 7 is a flowchart showing an example of the operation of the detecting system according to the embodiment.

The detector 20 probes and acquires reflected wave intensity data (step St1). The processing device 10 designates the weld portion 53 by using the intensity data (step St2). The processing device 10 calculates the first center position (step St3). The processing device 10 calculates the second center position (step St4). The processing device 10 calculates the distance between the first center position and the second center position (step St5). The processing device 10 compares a value based on the distance with the first threshold (step St6). When the value is greater than the first threshold, the processing device 10 outputs the first notification (step St7).

Advantages of the embodiment will now be described.

In the joined body 50, the multiple members are joined at the weld portion 53. The position of the weld portion 53 affects the quality of the joined body 50. For example, when the position of the weld portion 53 is misaligned from the design position, there is a possibility that the strength of the joined body 50 may be less than the design strength.

A weld mark, which is a circular recess, is formed in the upper surface of the weld portion 53. The position of the weld mark can be detected from an image acquired by a camera. However, there is a possibility that the center position of the weld mark that can be confirmed by its appearance may be misaligned from the center position of the weld portion 53 that is actually joined. It is desirable to use the actual center position of the weld portion 53 to determine the reliability of the strength or the like of the manufactured joined body 50 with higher accuracy.

For this problem, the processing device 10 according to the embodiment designates the weld portion 53 of the joined body 50 by using the intensity data when receiving the reflected wave intensity data from the detector 20. Then, the processing device 10 calculates the first center position C1 of the weld portion 53 in the X-Y plane. According to the embodiment, the actual center position of the weld portion 53 can be obtained regardless of the position, shape, etc., of the external appearance of the weld mark. According to the embodiment, compared to when the position of the weld portion 53 is detected using a camera, the position of the weld portion 53 is obtained with higher accuracy. Also, according to the embodiment, a more accurate position of the weld portion 53 can be calculated from the data used in the inspection of the weld portion 53 without using an external device such as a camera or the like to designate the position of the weld portion 53.

The processing device 10 may calculate the second center position in the X-Y plane of the intensity data thus obtained, and may calculate the distance D between the first center position C1 and the second center position C2. The position of the weld portion 53 is predesigned. Resistance spot welding is performed to form the weld portion 53 at the predesigned position (the design position). For example, the distal end of the detector 20 abuts the design position. When probing is performed in a state in which the detector 20 contacts the design position, the center in the X-Y plane of the intensity data is positioned at the center of the design position. In other words, the second center position C2 corresponds to the predesigned center position of the weld portion 53. A long distance D between the first center position C1 and the second center position C2 indicates that the actual position of the weld portion 53 is misaligned from the design position of the weld portion 53.

The processing device 10 may determine the goodness of the joined body 50 by using the distance D. As the distance D increases, the likelihood of the reliability degrading increases, and the likelihood of the joined body 50 being defective increases. The processing device 10 determines the joined body 50 to be defective when a value based on the distance D is greater than the first threshold. The processing device 10 determines the joined body 50 to be good when the value based on the distance D is not more than the first threshold.

The processing device 10 may output the first notification to the user when the value based on the distance D is greater than the first threshold. For example, the processing device 10 transmits first data as the first notification to the terminal device of the user. The processing device 10 may cause a monitor to display the first data. The user is a user of the processing device 10 or the detector 20, a manager of a welding process, a manager of an inspection process of the weld, etc. A weld defect can be notified to the user by the transmission of the first data.

To improve the convenience of the user, the first data may include identification information for designating the joined body 50. The first data may include identification information of the welding process of the joined body 50. The first data may include text (an error message) indicating that the first center position C1 is misaligned from the second center position C2. The first data may include the image data shown in FIG. 5 or FIG. 6. At least one of the first center position C1, the second center position C2, or the distance D may be shown on the image data.

The processing device 10 may output a sound or light from an output device that emits a sound or light. The defect of the weld can be notified to the user by the output of the sound or light.

The processing device 10 may inspect the weld portion 53 by using the intensity data. The diameter of the weld portion 53 is used in the inspection. The processing device 10 calculates the major diameter of the weld portion 53 by using the two-dimensional data shown in FIG. 5 or FIG. 6. The major diameter corresponds to the distance between the two most distant points on the outer edge of the weld portion 53. The weld portion 53 compares the major diameter with a preset threshold. When the major diameter is greater than the threshold, the weld portion 53 determines that the joined body 50 has passed. When the major diameter is not more than the threshold, the weld portion 53 determines that the joined body 50 has failed.

The two-dimensional data that is generated when calculating the first center position and is shown in FIG. 5 or FIG. 6 can be utilized in the inspection. Therefore, the processing time can be shorter when using the intensity data to calculate the first center position and perform the inspection than when a camera is used to calculate the center position of the weld mark and perform the inspection.

When performing the inspection, the processing device 10 may determine the accuracy of the inspection by using the distance D. The reliability of the inspection increases as the distance D decreases. When the distance D is long, for example, a portion of the weld portion 53 is positioned outside the area of the obtained intensity data as shown in FIG. 6. In such a case, there is a possibility that the calculated diameter of the weld portion 53 may be less than the actual value. There is a possibility that the weld portion 53 may be determined to be defective even when the weld portion 53 itself is appropriately formed.

When the value based on the distance D is greater than the second threshold, the processing device 10 determines the inspection result to be inaccurate. When the value based on the distance D is not more than the second threshold, the processing device 10 determines the inspection result to be accurate. The second threshold is set according to the effects of the misalignment of the position of the weld portion 53 with respect to the design position on the inspection result. The second threshold may be the same as the first threshold or different from the first threshold.

When the value based on the distance D is greater than the second threshold, the processing device 10 may output the second notification to the user. The second notification indicates to the user that the inspection result of the weld portion 53 is inaccurate. For example, the processing device 10 transmits second data as the notification to the terminal device of the user. The processing device 10 may cause a monitor to display the second data. The user can be notified that the inspection is inaccurate by the transmission of the second data.

To improve the convenience of the user, the second data may include the identification information of the inspection process. The second data may include text (an error message) indicating that the inspection result is inaccurate. The second data may include the image data shown in FIG. 5 or FIG. 6. At least one of the first center position C1, the second center position C2, or the distance D may be shown on the image data.

Figure 8:
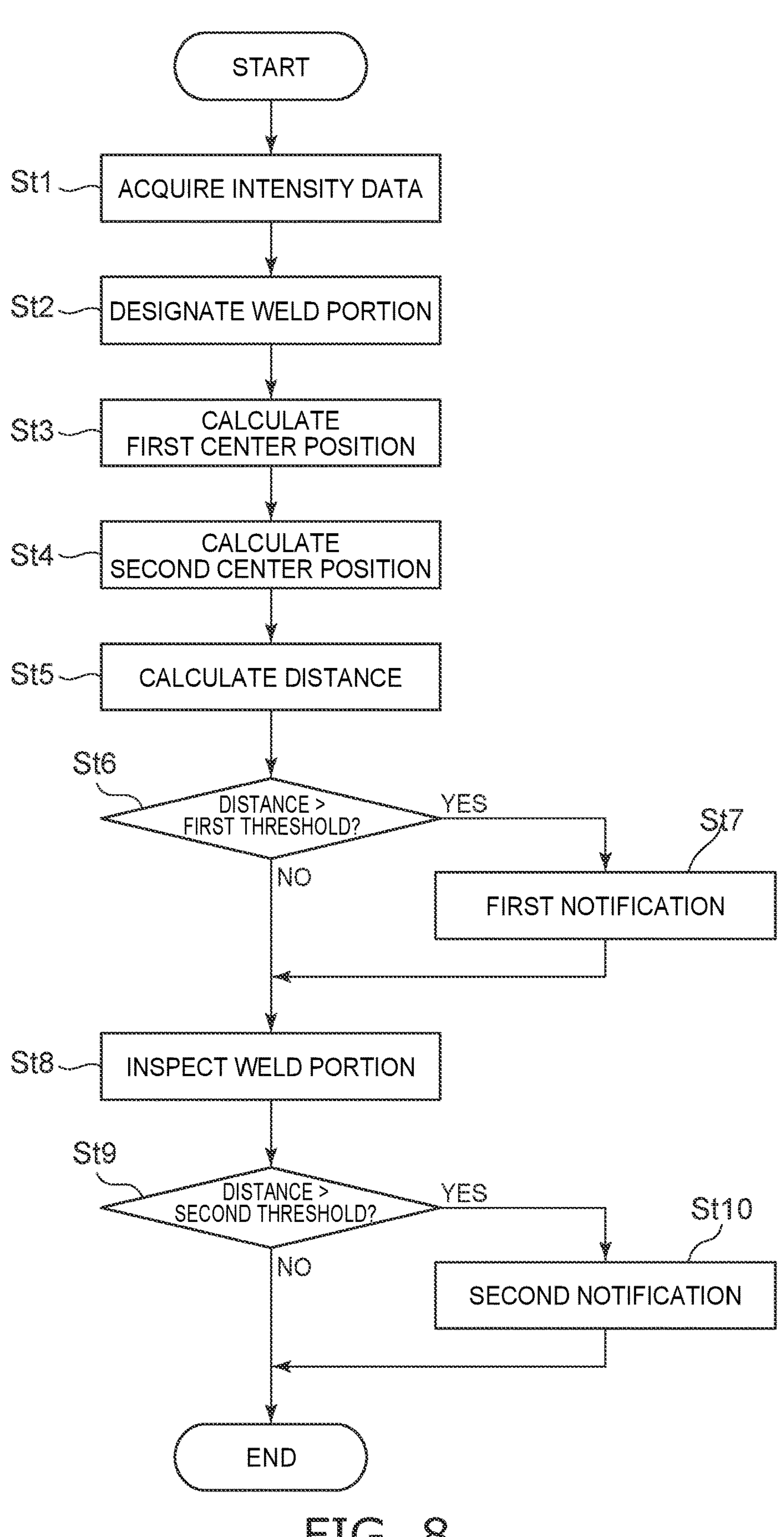
FIG. 8 is a flowchart showing another example of the operation of the detecting system according to the embodiment.

FIG. 8 is a flowchart showing another example of the operation of the detecting system according to the embodiment.

Compared to the operation shown in FIG. 7, the operation shown in FIG. 8 further includes steps St8 to 10. After step St7, the processing device 10 inspects the weld portion 53 (step St8). The processing device 10 compares the value based on the distance with the second threshold (step St9). When the value is greater than the second threshold, the processing device 10 outputs the second notification (step St10).

The timing of the operations of step St6 and subsequent steps is modifiable as appropriate in the flowchart shown in FIG. 8. For example, step St6 and 7 may be performed after step St8 and 9. When the first threshold and the second threshold are the same value, the comparison between the distance and these thresholds may be performed in one determination processing; and the first notification and the second notification may be output simultaneously.

The operation shown in FIG. 8 may be executed as an inspection method to inspect the weld portion 53.

Figure 9:
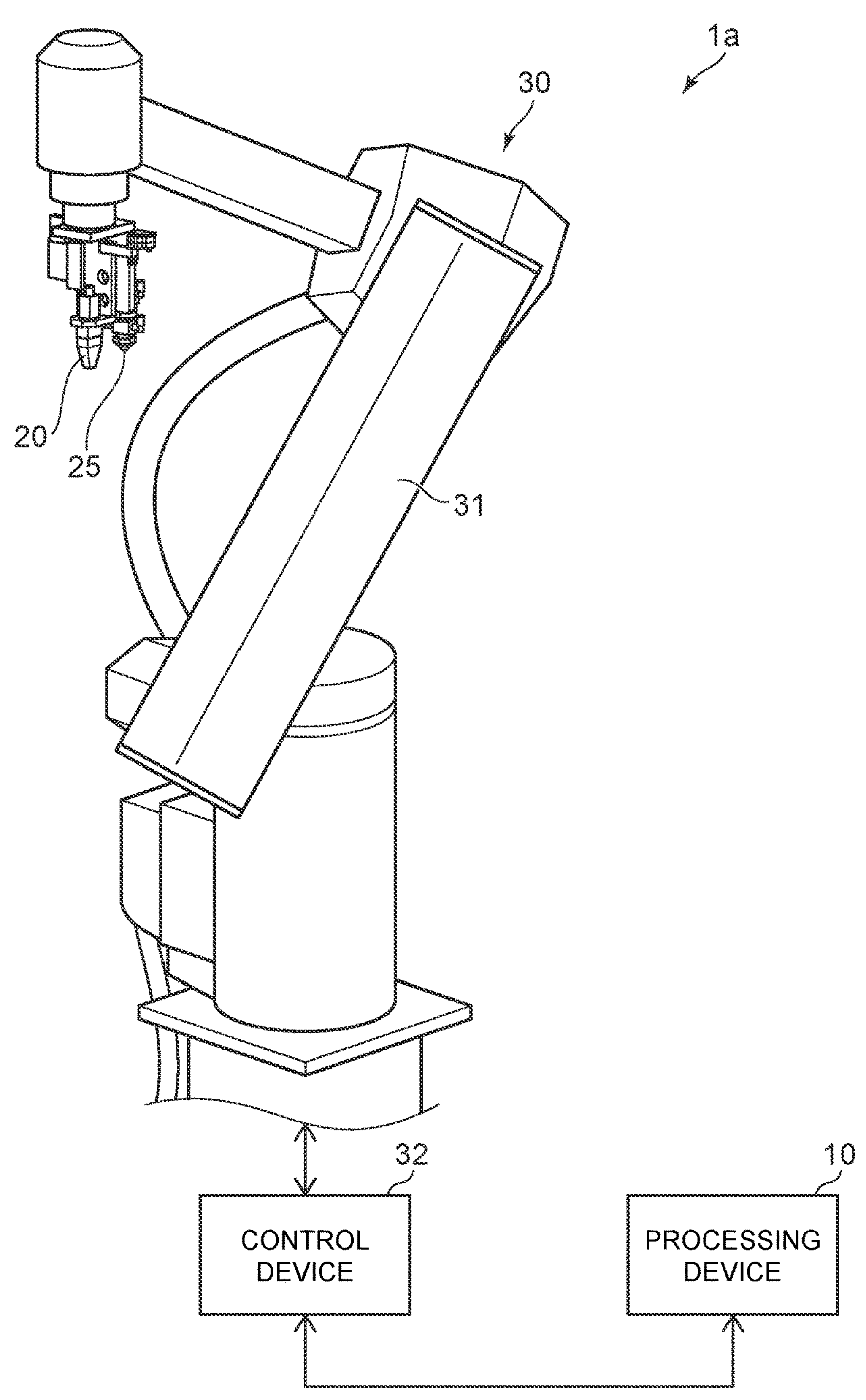
FIG. 9 is a schematic view showing another detecting system according to the embodiment.

FIG. 9 is a schematic view showing another detecting system according to the embodiment.

The detecting system 1*a* shown in FIG. 9 includes the processing device 10, the detector 20, and a robot 30. The robot 30 includes a manipulator 31 and a control device 32. As shown in FIG. 9, the detector 20 may be mounted to the manipulator 31.

In the example shown in FIG. 9, the manipulator 31 is vertical articulated. The manipulator 31 may be horizontal articulated or parallel link. The detector 20 is located at the distal end of the manipulator 31 as an end effector. The control device 32 controls the operation of the manipulator 31. The control device 32 is a so-called robot controller.

As shown in FIG. 9, the detector 20 and a dispenser 25 are located at the distal end of the manipulator 31. The dispenser 25 dispenses a couplant liquid toward the weld portion 53. After the couplant liquid is dispensed, the control device 32 causes the distal end of the detector 20 to abut the weld portion 53.

In the detecting system 1*a*, the processing device 10 is configured to perform the operation shown in FIG. 7 or FIG. 8. The detecting system 1*a* also may be configured to correct the position of the detector 20 according to the calculation result of the first and second center positions.

Figure 10:
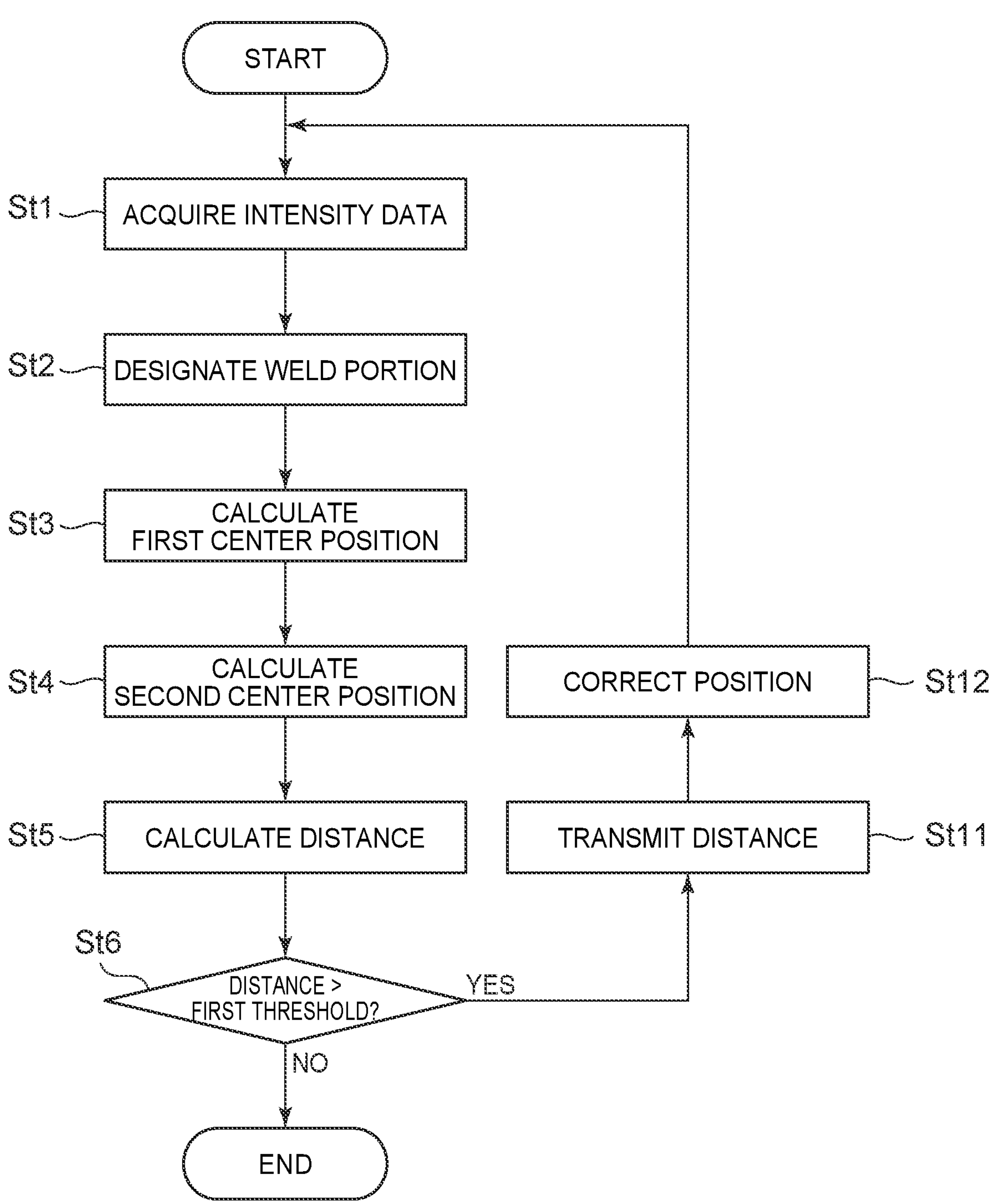
FIG. 10 is a flowchart showing an example of the operation of the other detecting system according to the embodiment.

FIG. 10 is a flowchart showing an example of the operation of the other detecting system according to the embodiment.

Compared with the operation shown in FIG. 7, the operation shown in FIG. 10 includes steps St11 and St12 instead of step St7.

When the value based on the distance is greater than the first threshold in step St6, the processing device 10 transmits the distance between the first center position and the second center position to the control device 32 (step St11). The distance corresponds to the misalignment amount of the second center position with respect to the first center position. The control device 32 corrects the position of the detector 20 by operating the manipulator 31 to reduce the distance (step St12). For example, the control device 32 operates the manipulator 31 to align the first center position and the second center position. Step St1 is re-performed after step St12.

By automatically correcting the position of the detector 20 according to the misalignment amount of the second center position with respect to the first center position, more reliable intensity data is obtained. For example, the accuracy of the inspection of the weld portion 53 can be increased by using the intensity data.

In the operation shown in FIG. 10, the first notification may be transmitted as shown in FIG. 7 in addition to the correction of the position of the detector 20 in steps St11 and St12. When the value based on the distance is not more than the first threshold in step St6, the weld portion 53 may be inspected and the value based on the distance may be compared with the second threshold as shown in FIG. 8.

Figure 11:
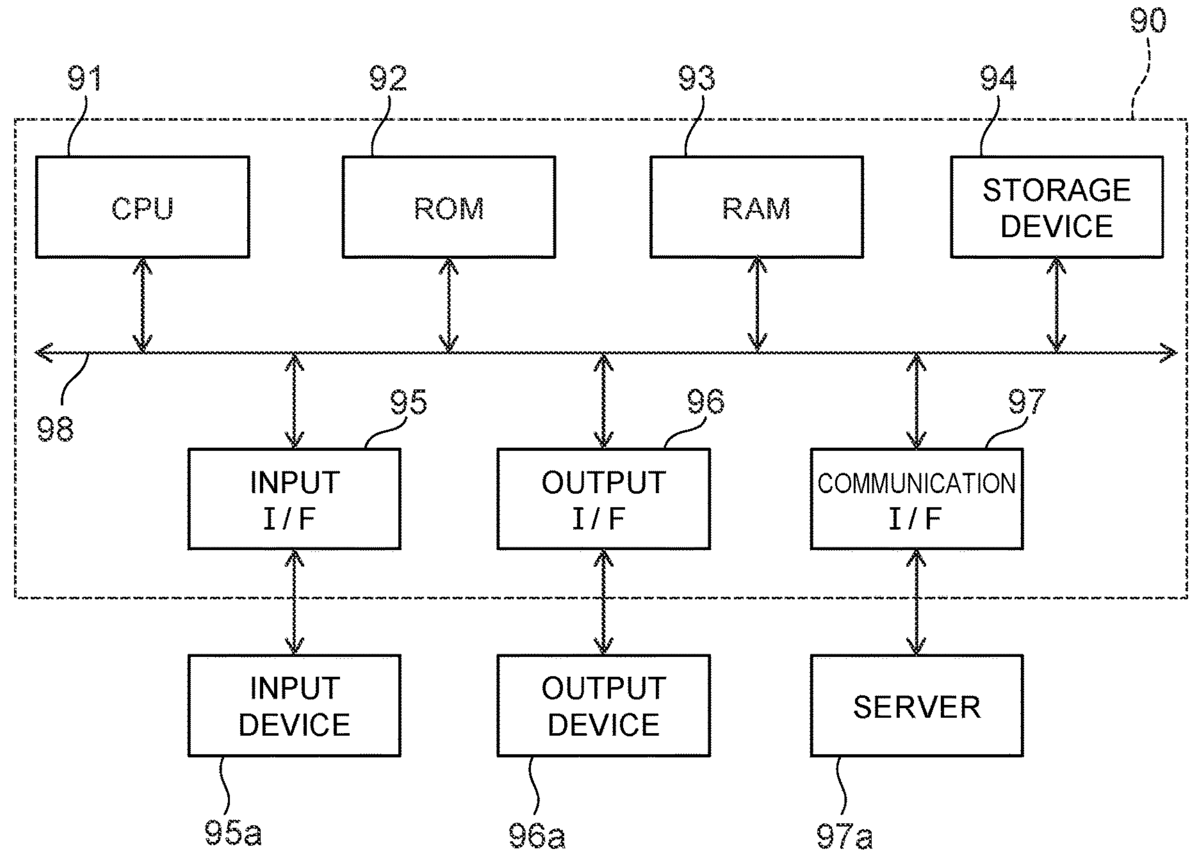
FIG. 11 is a schematic view showing a hardware configuration.

FIG. 11 is a schematic view showing a hardware configuration.

For example, a computer 90 shown in FIG. 11 can be used as the processing device 10. The computer 90 includes a CPU 91, ROM 92, RAM 93, a storage device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the storage device 94. When executing the programs, the CPU 91 executes various processing by controlling configurations via a system bus 98.

The storage device 94 stores data necessary for executing the programs and/or data obtained by executing the programs. The storage device 94 includes at least one selected from a hard disk drive (HDD) and a solid state drive (SSD).

The input interface (I/F) 95 connects the processing device 10 and an input device 95*a*. The input I/F 95 is, for example, a serial bus interface such as USB, etc. The CPU 91 can read various data from the input device 95*a* via the input I/F 95. The input device 95*a* includes at least one selected from a mouse, a keyboard, a microphone (audio input), and a touchpad.

The output interface (I/F) 96 connects the processing device 10 and an output device 96*a*. The output I/F 96 is, for example, an image output interface such as Digital Visual Interface (DVI), High-Definition Multimedia Interface (HDMI (registered trademark)), etc. The CPU 91 transmits signals (data) to the output device 96*a* via the output I/F 96. The output device 96*a* includes at least one selected from a monitor, a projector, a printer, an acoustic device, and a light-emitting device. A device such as a touch panel that functions as both the input device 95*a* and the output device 96*a* may be used.

The communication interface (I/F) 97 connects the processing device 10 and a server 97*a* outside the processing device 10. The communication I/F 97 is, for example, a network card such as a LAN card, etc. The CPU 91 can read various data from the server 97*a* via the communication I/F 97.

The processing of the various data described above may be recorded, as a program that can be executed by a computer, in a non-transitory computer-readable storage medium such as a magnetic disk (a flexible disk, a hard disk, etc.), an optical disk (CD-ROM, CD-R, CD-RW, DVD-ROM, DVD±R, DVD±RW, etc.), semiconductor memory, etc.

The information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition or the reading of the program may be performed via a network.

While certain embodiments of the inventions have been illustrated, these embodiments have been presented by way of example only, and are not intended to limit the scope of the inventions. These novel embodiments may be embodied in a variety of other forms; and various omissions, substitutions, modifications, etc., can be made without departing from the spirit of the inventions. These embodiments and their modifications are within the scope and spirit of the inventions and are within the scope of the inventions described in the claims and their equivalents. Also, the embodiments described above can be implemented in combination with each other.

What is claimed is:

1. A processing device, configured to:

receive, via a detector connected to the processing device, intensity data of a reflected wave obtained by transmitting an ultrasonic wave from the detector along a first direction toward a joined body, the detector configured to transmit the ultrasonic wave, detect the reflected wave, and transmit the intensity data to be received at the processing device;

designate a weld portion of the joined body by using the intensity data, designating the weld portion including determining, at points in a first plane crossing the first direction, whether a peak corresponding to a lower surface of a first member of the joined body exists in a reflected wave intensity distribution in the first direction, determining that points at which the peak is not detected are joined, and designating a cluster of the points determined to be joined as the weld portion;

calculate a first center position of the designated weld portion in the first plane crossing the first direction;

calculate, in the first plane, a distance between the first center position of the designated weld portion and a second center position corresponding to a design position of the weld portion; and determine a goodness of the joined body by using the calculated distance.

2. The processing device according to claim 1, wherein the processing device outputs a first notification to a user when a value based on the distance is greater than a first threshold.

3. The processing device according to claim 1, wherein the processing device inspects the weld portion by using a diameter of the designated weld portion.

4. The processing device according to claim 3, wherein the processing device determines an accuracy of the inspection of the weld portion by using the distance.

5. The processing device according to claim 4, wherein the processing device outputs a second notification to a user when a value based on the distance is greater than a second threshold.

6. A detecting system, comprising:

the processing device according to claim 1; and a detector configured to transmit the ultrasonic wave, detect the reflected wave, and transmit the intensity data to the processing device.

7. The detecting system according to claim 6, further comprising:

a manipulator, the detector being located at a distal end of the manipulator.

8. The detecting system according to claim 7, further comprising:

a control device configured to control the manipulator, the control device correcting a position of the detector by operating the manipulator to reduce a distance between the first center position and the second center position of the intensity data in the first plane when a value based on the distance is greater than a first threshold, the detector transmitting the ultrasonic wave toward the weld portion and detecting the reflected wave at the corrected position.

9. A processing method, comprising:

receiving, via a detector connected to a processing device, intensity data of a reflected wave obtained by transmitting an ultrasonic wave from the detector along a first direction toward a joined body, the detector configured to transmit the ultrasonic wave, detect the reflected wave, and transmit the intensity data to be received at the processing device;

designating a weld portion of the joined body by using the intensity data, designating the weld portion including determining, at points in a first plane crossing the first direction, whether a peak corresponding to a lower surface of a first member of the joined body exists in a reflected wave intensity distribution in the first direction, determining that points at which the peak is not detected are joined, and designating a cluster of the points determined to be joined as the weld portion;

calculating a first center position of the designated weld portion in the first plane crossing the first direction;

calculating, in the first plane, a distance between the first center position of the designated weld portion and a second center position corresponding to a design position of the weld portion; and determining a goodness of the joined body by using the calculated distance.

10. An inspection method, comprising:

the processing method according to claim 9; and inspecting the weld portion using the intensity data.

11. The processing method according to claim 9, further comprising:

outputting a first notification to a user when a value based on the distance is greater than a first threshold.

12. The inspection method according to claim 10, wherein in the inspecting, a diameter of the designated weld portion is calculated using the intensity data and the weld portion is inspected based on the diameter.

13. The inspection method according to claim 12, further comprising:

determining an accuracy of the inspection of the weld portion by using the distance.

14. The inspection method according to claim 12, further comprising:

outputting a second notification to a user when a value based on the distance is greater than a second threshold.

15. A non-transitory computer-readable storage medium storing a program, the program configured to cause a processing device to:

receive, via a detector connected to the processing device, intensity data of a reflected wave obtained by transmitting an ultrasonic wave from the detector along a first direction toward a joined body, the detector configured to transmit the ultrasonic wave, detect the reflected wave, and transmit the intensity data to be received at the processing device;

designate a weld portion of the joined body by using the intensity data, designating the weld portion including determining, at points in a first plane crossing the first direction, whether a peak corresponding to a lower surface of a first member of the joined body exists in a reflected wave intensity distribution in the first direction, determining that points at which the peak is not detected are joined, and designating a cluster of the points determined to be joined as the weld portion;

calculate a first center position of the designated weld portion in the first plane crossing the first direction;

calculate, in the first plane, a distance between the first center position of the designated weld portion and a second center position corresponding to a design position of the weld portion; and determine a goodness of the joined body by using the calculated distance.

16. The storage medium according to claim 15, wherein the program further configured to cause the processing device to inspect the weld portion using the intensity data.

* * * * *